United States Patent [19]

Warne, Jr.

[11] 4,261,591

[45] Apr. 14, 1981

[54] FULLY TRIANGULATED, INDIVIDUAL WHEEL SUSPENSION SYSTEM

[76] Inventor: John P. Warne, Jr., 2511 Princeton Ave., Midland, Tex. 79701

[21] Appl. No.: 49,416

[22] Filed: Jun. 18, 1979

[51] Int. Cl.³ .............................................. B60G 7/00
[52] U.S. Cl. ................................... 280/675; 280/721; 267/57
[58] Field of Search .............. 280/690, 675, 664, 665, 280/663, 660, 70, 720–724, 710; 267/57

[56] References Cited

U.S. PATENT DOCUMENTS

| | | | |
|---|---|---|---|
| 2,130,288 | 9/1938 | Olley | 280/675 |
| 2,776,147 | 1/1957 | Bamford | 280/724 |
| 3,028,173 | 4/1962 | Leffler et al. | 280/664 |
| 3,077,762 | 6/1962 | Axtmann | 280/664 X |
| 3,096,085 | 7/1963 | Owens | 267/57 |
| 3,556,544 | 1/1971 | Abbott et al. | 267/57 X |
| 3,704,029 | 11/1972 | Bailleux | 280/710 |
| 3,773,349 | 11/1973 | Boyd | 280/721 |

FOREIGN PATENT DOCUMENTS

494547  5/1954  Italy ............................................ 267/57
983048  2/1965  United Kingdom ...................... 280/665

*Primary Examiner*—John P. Silverstein
*Assistant Examiner*—Norman L. Stack, Jr.

[57] ABSTRACT

A fully triangulated automobile wheel suspension arm assembly which provides a rigid connection between an automotive wheel-bearing hub and two pivot points connecting the suspension assembly to the superstructure of the vehicle. The suspension system includes a lateral tube affixed to a vehicle body. The tube has a free end to which there is journaled one end of a trailing arm. A torsion bar has one end affixed to the lateral tube and a free end affixed to the trailing arm so that pivotal movement of the trailing arm about the lateral tube is resisted by the torsion bar. The other end of the trailing arm is affixed to a wheel-bearing hub, and a wheel is received in journaled relationship respective to the hub. A strut connects the hub to a bracket located on the lateral tube at a location which is spaced inboard of the trailing arm journal. This provides a rigid connection between the wheel-bearing hub and the two pivot points, so that the hub is restrained to move in a substantially vertical plane.

8 Claims, 12 Drawing Figures

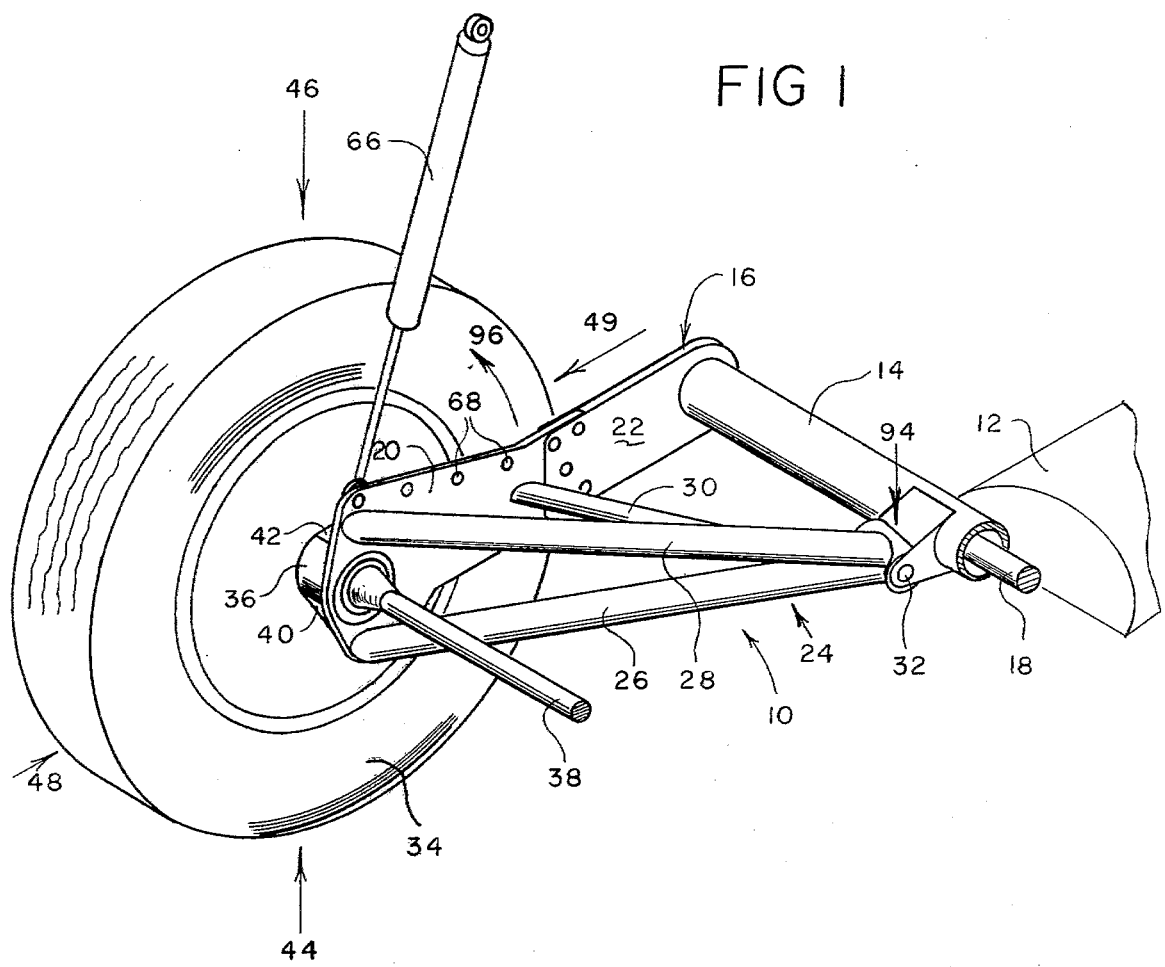
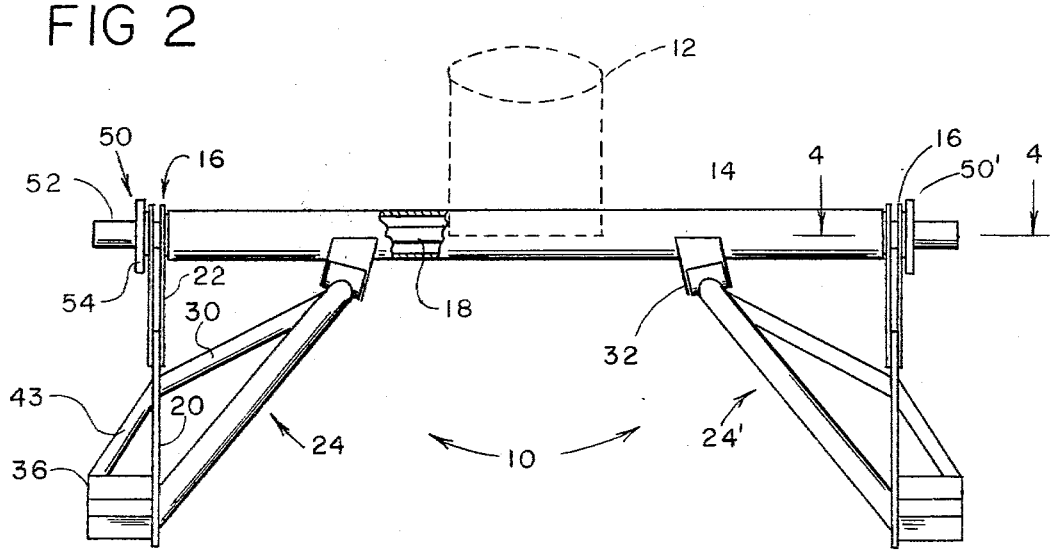

FULLY TRIANGULATED, INDIVIDUAL WHEEL SUSPENSION SYSTEM

BACKGROUND OF THE INVENTION

This invention relates to a wheel suspension system by which an automobile wheel bearing hub is connected to two chassis pivot points located on the automobile in such a manner that the hub pivotally moves in a single plane about the axis of the two chassis pivot points.

Prior art independent rear suspension systems have proven unsatisfactory for enduring the sustained driving forces encountered during racing events such as off-road racing, drag racing, and pylon racing. Various modifications to some of the prior art suspension systems have been made in an attempt to avoid bending of the structural components by the provision of gussets welded to the prior art suspension arms. However, this increases the total unsprung weight, which is undesirable.

Accordingly, it would be desirable to have provided a fully triangulated, rigid, lightweight suspension system which pivotally interconnects a wheel bearing hub to spaced apart pivot points located on the chassis of an automobile, with all of the components of the suspension assembly being arranged so that only tensile and compressive forces are present therein. Such a design would eliminate the bending and torsional moments which are inherent in presently available suspension arm designs, and thereby avoid premature failure of the rear suspension system.

SUMMARY OF THE INVENTION

A fully triangulated, automobile wheel suspension system provides a strong pivotal connection between a wheel bearing hub and spaced suspension pivot points located on the automobile chassis. In one embodiment of the invention, the wheel suspension system includes a lateral tube affixed to the vehicle body so that an outboard end is presented to which there is journaled one end of a trailing arm. A torsional bar has one end affixed to the lateral tube and a free end affixed to the trailing arm so that the trailing arm springingly resists pivotal movement about the lateral tube. The other end of the trailing arm is affixed to a wheel bearing hub. A wheel is suitably journaled to the hub. A strut connects the hub to a bracket located on the lateral tube in spaced relationship and inboard of the trailing arm journal.

This system provides a rigid connection between the wheel bearing hub and the two pivot points on the vehicle chassis, and restrains pivotal movement of the wheel bearing hub to a single, substantially vertical plane or to a single curved plane.

Accordingly, a primary object of the present invention is the provision of a fully triangulated, lightweight apparatus by which a wheel bearing hub is pivotally connected to spaced pivot points located on the chassis of an automobile.

Another object of the invention is to provide a fully triangulated, wheel suspension system having only tensile and compressive forces present therein.

A further object of this invention is to disclose and provide a fully triangulated, wheel suspension system which eliminates the bending and torsional moments which are inherent in many presently available suspension arm designs.

A still further object of this invention is the provision of a wheel suspension system comprising a trailing arm assembly attachable to spaced locations on the vehicle's chasis and which restrains pivotal movent of the hub to a predetermined slightly curved arc.

Still another object of this invention is the provision of a fully triangulated wheel suspension system which can be retrofitted to vehicles having a torsion bar suspension system.

These and various other objects and advantages of the invention will become readily apparent to those skilled in the art upon reading the following detailed description and claims and by referring to the accompanying drawings.

The above objects are attained in accordance with the present invention by the provision of the a combination of elements which are fabricated in a manner substantially as described in the above abstract and summary.

BRIEF DESCRIPTION OF THE DRAWINGS

FIG. 1 is a perspective view of a fully triangulated, automobile wheel suspension arm assembly made in accordance with the present invention, with some parts being broken away therefrom;

FIG. 2 is a top plan view of a rear wheel suspension system made in accordance with the present invention, with some parts being broken away therefrom, and some of the remaining parts being shown in cross-section;

DETAILED DESCRIPTION OF THE PREFERRED EMBODIMENTS

Figure 3:
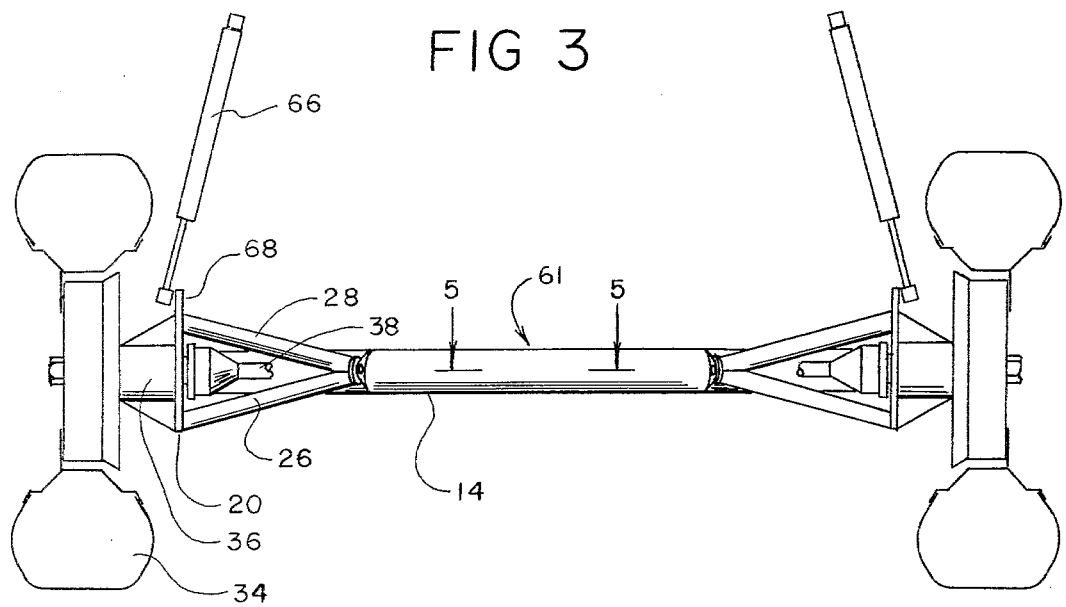
FIG. 3 is a rear view of the apparatus disclosed in FIG. 2.

In the figures of the drawings, numeral 10 generally indicates a fully triangulated, trailing arm vehicle wheel suspension system. The apparatus of the present invention preferably is utilized in combination with a prior art vehicle chassis which includes a tunnel 12, or main longitudinal, vehicle support member, to which these is attached a lateral tube 14. The lateral tube is connected to the vehicle chassis and supports the trailing arm assembly of the present invention.

A trailing arm 16 has one end journaled to the outboard end of the lateral tube so that the trailing arm can pivot about the longitudinal, axial centerline thereof. A torsion bar 18 is concentrically arranged within the lateral tube and includes one end which is fixed respective to the vehicle chassis and another end which is fixed respective to the pivot point of the trailing arm.

The trailing arm includes plate members 20 and 22 which are rigidly affixed to one another, although a single plate member can also be satisfactorily employed, as will be discussed in greater detail later on.

A strut assembly, generally indicated by the arrow at numeral 24 is rigidly attached to the free end of the trailing arm, and is comprised of a lower strut member 26, an upper strut member 28, and an intermediate strut member 30. Each of the strut members has one end thereof affixed to the trailing arm in spaced relationship to one another, and another end attached to one another and journaled to a bracket 32. The bracket 32 is affixed to the vehicle chassis by attachment to the beforementioned lateral tube.

Wheel assembly 34 is received in supported, journaled relationship respective to hub 36. Lateral drive shaft 38 sealingly enters the hub and drivingly connects to the wheel. Gussets 40 and 42 as well as strut 43 increase the structural integrity of the attachment of the hub to the free end of the trailing arm.

Numerals 44, 46, 48 and 49 indicate the loads imposed on the wheel and will be discussed in greater detail later on in this disclosure.

Figure 4:
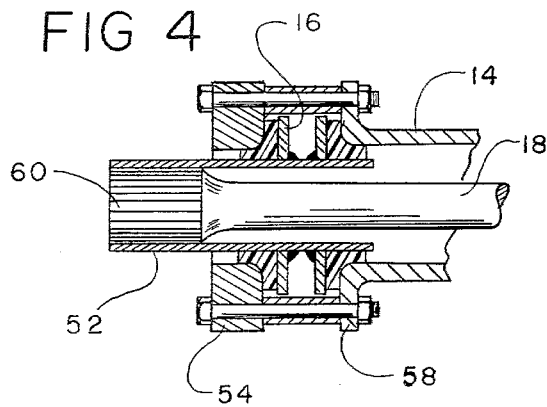
FIG. 4 is an enlarged cross-sectional view taken along line 4—4 of FIG. 2.

In FIGS. 2 and 4, there is illustrated a slip joint in the form of a journal 50, which includes a small tube 52 rigidly affixed to the trailing arm, and arranged to rotate respective to a plate member 54. Annular, molded rubber mounts 56 and 57 are interposed between the annular flanges 54 and 58.

The free end of the torsion bar preferably is splined, as indicated by numeral 60, and is received within a complementary splined, outer marginal portion of the small tube 52.

Figure 5:
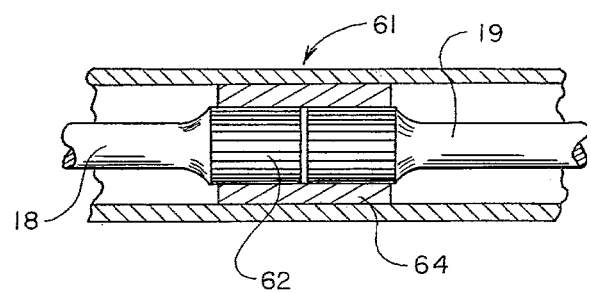
FIG. 5 is an enlarged, part cross-sectional view taken along line 5—5 of FIG. 3.

As best seen in FIGS. 3 and 5, the fixed end 62 of the torsion bar is received within a similarly splined, female member 64 located in fixed relationship at the medial portion 61 of the lateral tube.

As seen in FIGS. 1 and 3, a commercially available shock absorber assembly 66 is connected at apertures 68 located on the upper marginal edge of the trailing arm to enable the shock absorber to be interposed between the vehicle chassis and the trailing arm assembly.

Figure 6:
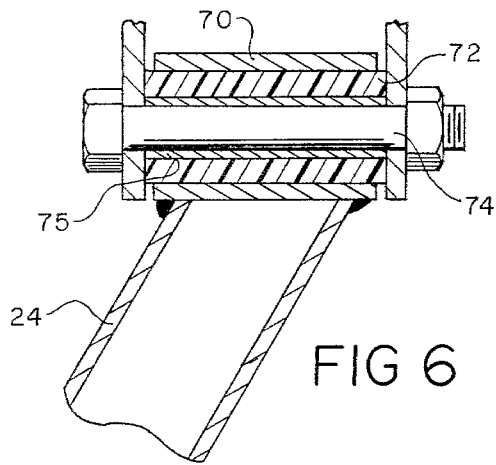
FIG. 6 is an enlarged, cross-sectional view of part of the apparatus disclosed in FIGS. 1 and 2.

FIG. 6 illustrates the details of the bracket 32. The bracket includes a metal, cylindrical member 70 affixed to the joined ends of strut members 26, 28, and 30. An annular, cylindrical, rubber member forms a cushion 72 which insulates bolt 74 and metal sleeve 75 from the cylinder 70 and forms a pivot point which permits the opposed, diverging ends of the strut assembly to pivot about the bolt and sleeve.

Figure 7:
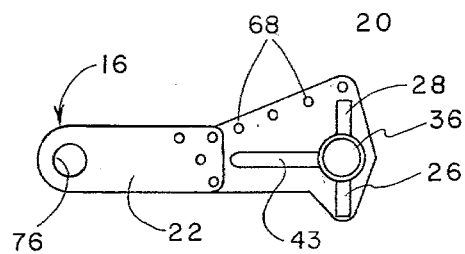
FIG. 7 is a detail of part of the apparatus disclosed in the foregoing figures.
Figure 8:
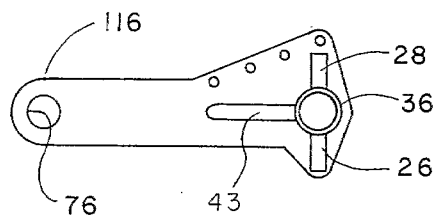
FIG. 8 is a modification of the apparatus disclosed in FIG. 7.

FIG. 7 sets forth additional details of the trailing arm 16. The pivotal end of the arm is apertured at 36 for receiving the wheel hub in attached relationship thereto. FIG. 8 illustrates that the trailing arm can be made from a single plate rather than the before mentioned bolted together pair of members 20 and 22.

Figure 9:
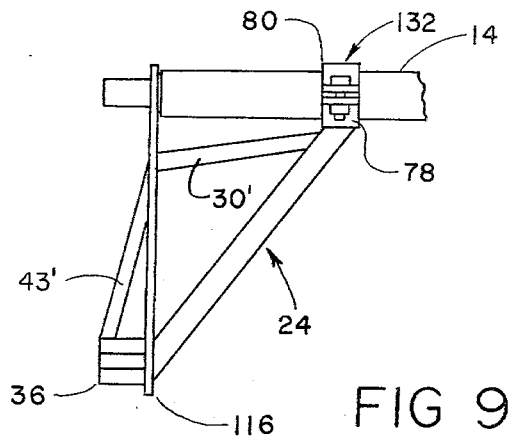
FIG. 9 is a broken top plan view which sets forth a modification of the apparatus disclosed in FIG. 1.

In FIG. 9, the intermediate strut 30' is attached to a split, cylindrical bracket comprised of halves 78 and 80 bolted together and circumferentially extended about a marginal length of the lateral tube 14, thereby forming a journal therewith. An outboard strut member 43' is attached to the outer extremity of the wheel hub and transfers loads into the trailing arm at a location which coincides with the attachment point of the outer end of member 30'.

Figure 10:
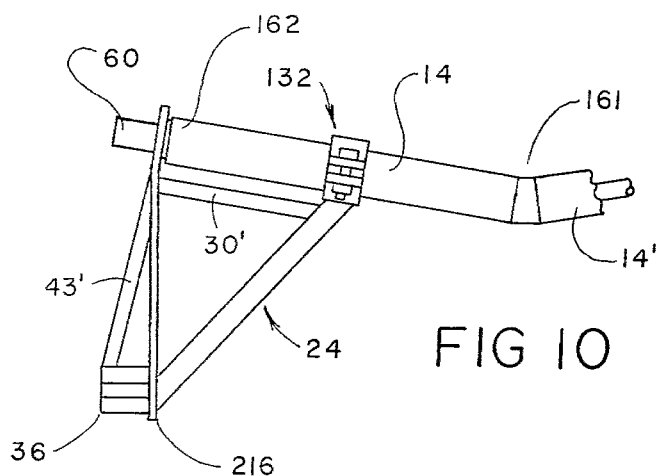
FIG. 10 sets forth another modification of the apparatus disclosed in FIG. 1.

In FIG. 10, the lateral tube has been divided into opposed members 14, 14', which are joined to the chasses at 161 and 162 and form an obtuse angle therebetween. This necessitates bending the forward marginal portion of the trailing arm in the general area which receives the free end 60 of the torsion bar so that the rear part of the arm trails in aligned relationship respective to the direction of travel of the vehicle.

Figure 11:
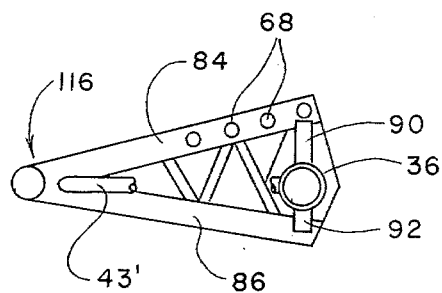
FIG. 11 sets forth a modification of part of the apparatus disclosed in FIG. 1; and, FIG. 12 sets forth still another modification of the present invention.

In FIG. 11, the trailing arm is seen to be built up of a plurlaity of tubular members 84 and 86. Strut member 43' connects to the fixed end of the trailing arm and to the hub 36. Additional struts or gussets 90 and 92 are connected between the upper and lower free end of the arm and the hub 36.

Figure 12:
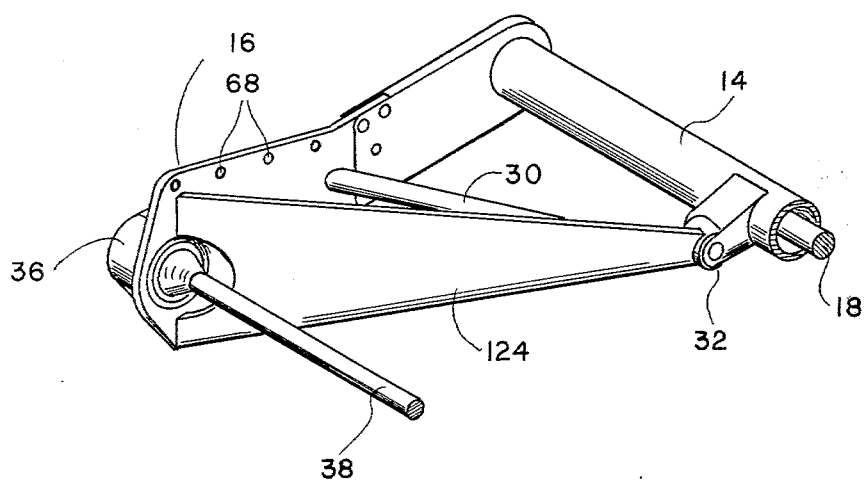

In FIG. 12, both the trailing arm and strut member are seen to be comprised of plate members 124 and 16. Intermediate strut member 30 is connected to the forward end of the plate member 124 in proximity of the bracket 32 and to a medial portion of the trailing arm.

In operation, the embodiment of the invention disclosed in FIGS. 1, 2, 3, 7, and 12 can be carried out in conjunction with a conventional automobile having a lateral tube and torsion bar 18 connecting to a forward plate member 22. The trailing arm assembly of the present invention is connected to the automobile by bolting plate member 20 and the components of the strut assembly thereto. The journaled end of the strut assembly is connected to the existing bracket 32, thereby providing the vehicle with a fully triangulated, trailing arm, wheel suspension assembly made in accordance with the present invention.

In the embodiment of the invention disclosed in FIGS. 8 and 9, the entire trailing arm assembly 116 is attached to the lateral tube by utilizing a journal means such as disclosed in FIG. 4, and with the split clamp 78, 80 being substituted for the bracket assembly disclosed at 32 in FIG. 2, for example. This embodiment of the invention can be used in retrofitting vehicles, or alternatively, it can be incorporated into the vehicle during manufacture thereof.

The embodiment of FIG. 10 preferably is incorporated into the vehicle during manufacture, although in some instances, it may be desirable to retrofit a vehicle with the assembly disclosed in FIG. 10.

As seen in FIG. 1, wheel load 44 is transmitted through gussets 40 and 42, and into compressive and tensile loads in the lower and upper struts 26 and 28 of the strut assembly. The resulting force 94 at bracket 32 is resisted by the chassis of the vehicle.

The resultant force from the wheel load 44 also effects a moment 96 which is opposed by the trailing arm 16. This moment is transmitted to the chassis journal or pivot located at the outboard end of the lateral tube. Downwardly directed wheel loads 46 are counteracted by the trailing arm in a manner opposite to the forces 44.

Wheel load 48 is transmitted by compressive forces in struts 43 and 30 and tensile forces in struts 26 and 28 into the bracket 32. Wheel load 48 is also transmitted by compressive forces in plate members 20 and 22 into the journal at the outboard end of lateral tube 14. Wheel load 49 is transmitted to the lateral tube 14 and the bracket 32 by forces in these same struct and plate members opposite in direction to those aforementioned.

The present suspension system can be used on off-road race cars for many miles over various rough terrain with no evidence of distortion of the trailing arm assembly.

In the first embodiment of the invention, the off-set or spaced relationship of the axial centerlines of the pivot points at the forward ends of the trailing arm and strut assmebly causes the wheel to travel in a curved plane as the wheel extends from the full up to the full down position. During this time the plate member of the trailing arm must flex or bend out of the vertical plane, which causes a change in wheel camber. This change in wheel camber is desirable because it inclines the tire at an angle which helps oppose cornering forces. This change in camber also occurs in the embodiment of FIGS. 10 and 12.

In FIGS. 8, 9, and 11, however, there is no change in camber such as seen in the other embodiments of the invention, because the pivotal attachments at the forward end of the trailing arm and strut assembly cause the assembly to pivot about a common longitudinal center line which lies normal to the direction of travel of the vehicle.

As another embodiment of this invention, it is considered within the comprehension of this invention to employ a resilient suspension member other than the torsion bar illustrated in the figures of the drawings. The resilient suspension member can be a coil spring, for example, placed between the vehicle chassis and either the trailing arm or strut assembly at a location rearward of the pivot points. The forward end of the trailings arm and the strut assembly can then be pivoted to the vehicle chassis rather than to a lateral tube, as shown in the drawings.

I claim:

1. In a vehicle having a laterally disposed torsion bar housing to which there is pivotally attached a trailing arm in the form of a vertically oriented plate member, a journal means at the forward end of the plate member by which it is attached to the outboard end of the housing, with the other end of the plate member being affixed to a vehicle wheel hub;

a torsion bar disposed within said housing and having one end affixed to a medial part of the housing and the other end being fixed to the journaled end of the plate member; the improvement comprising:

a strut assembly connected to said other end of the plate member in proximity of said hub, said strut assembly extends forwardly and inwardly into journaled relationship respective to a medial part of the torsion bar housing;

said strut assembly includes two longitudinal members, one end of each member is attached at vertically spaced apart locations to the trailing end of said plate member, the other end of said longitudinal members are joined together in attached relationship at the journaled connection on the medial part of the torsion bar housing;

thereby providing a fully triangulated, individual wheel suspension system for the vehicle.

2. The improvement of claim 1 wherein the journaled end of the strut assembly lies along a lateral centerline which is spaced rearwardly of the axial centerline of the journaled end of the trailing arm.

3. The improvement of claim 2 wherein said trailing arm is rigidly affixed to the wheel hub;

and further includng an intermediate strut affixed to an inside medial part of the plate member, with said intermediate strut extending into fixed relationship respective to the end of the strut assembly which is pivotally mounted to the torsion bar housing.

4. The improvement of claim 1 wherein the journaled end of the strut assembly and the journaled end of the trailing arm lie along a common axial centerline.

5. The improvement of claim 1 wherein said journaled connection on the torsion bar housing is of circular configuration and circumferentially extends in journaled relationship about a marginal, medial portion of said torsion bar housing.

6. A fully triangulated vehicle wheel suspension assembly comprising a trailing arm having a forward end pivotally journaled to the vehicle chassis and a trailing end rigidly affixed to a wheel hub;

a strut assembly having a forward end pivotally journaled to the vehicle chassis at a location inboard of the trailing arm journal, and a rear end affixed to the wheel hub; said strut assembly includes two longitudinal members, one end of each member is attached at vertically spaced apart locations to the trailing arm, the other end of said longitudinal members are joined together in attached relationship at the journalled connection located at the forward end of the strut assembly;

and further including an intermediate strut having one end thereof affixed to an inside medial part of the trailing arm, with said intermediate strut extending into fixed relation respective to the forward end of said strut assembly;

said wheel hub has a marginal length which extends outboard of said trailing arm, an outer strut having one end affixed to the outboard end of the wheel hub and the other end of the strut affixed to an outside medial part of the trailing arm in proximity of the attachment point of said intermediate strut.

7. The improvement of claim 6 wherein the journaled end of the strut assembly lies along a lateral centerline which is spaced rearwardly of the axial centerline of the journaled end of the trailing arm.

8. The improvement of claim 6 wherein the journaled end of the strut assembly and the journaled end of the trailing arm lie along a common axial centerline.

* * * * *